July 21, 1942.  F. R. PORTER  2,290,293
POWER TRANSMISSION MEANS
Filed Aug. 23, 1940  4 Sheets-Sheet 2

Inventor
Finley R. Porter
By Cushman, Darby, Cushman
Attorneys

July 21, 1942.  F. R. PORTER  2,290,293
POWER TRANSMISSION MEANS
Filed Aug. 23, 1940  4 Sheets—Sheet 4

Inventor
Finley R. Porter
By Cushman, Darby & Cushman
Attorneys

Patented July 21, 1942

2,290,293

UNITED STATES PATENT OFFICE 2,290,293

POWER TRANSMISSION MEANS

Finley R. Porter, Southampton, Long Island, N. Y.

Application August 23, 1940, Serial No. 353,947

18 Claims. (Cl. 74—260)

This invention relates to power transmission means of infinite speed variability and has as its principal object to provide a system wherein torque may be amplified from the prime mover to the load with capacities ranging from any practical torque amplification to reasonable speed amplification with corresponding torque decrease.

As the compensating factor for variations between engine and load speeds, centrifugal force is preferably utilized and in this connection attention is called to my prior Patent No. 1,759,466, issued May 20, 1930, and in particular, as regards planeting systems such as are included by way of example in the embodiments which will be hereinafter described, to the prior patents to E. T. Shaw, Nos. 2,046,346 and 2,157,352, issued July 7, 1936, and May 9, 1939, respectively.

As illustrative of the various forms the invention may take in practice, I have shown three embodiments in the accompanying drawings with reference to which particular description of the invention will be made.

In these drawings.

Figure 1:
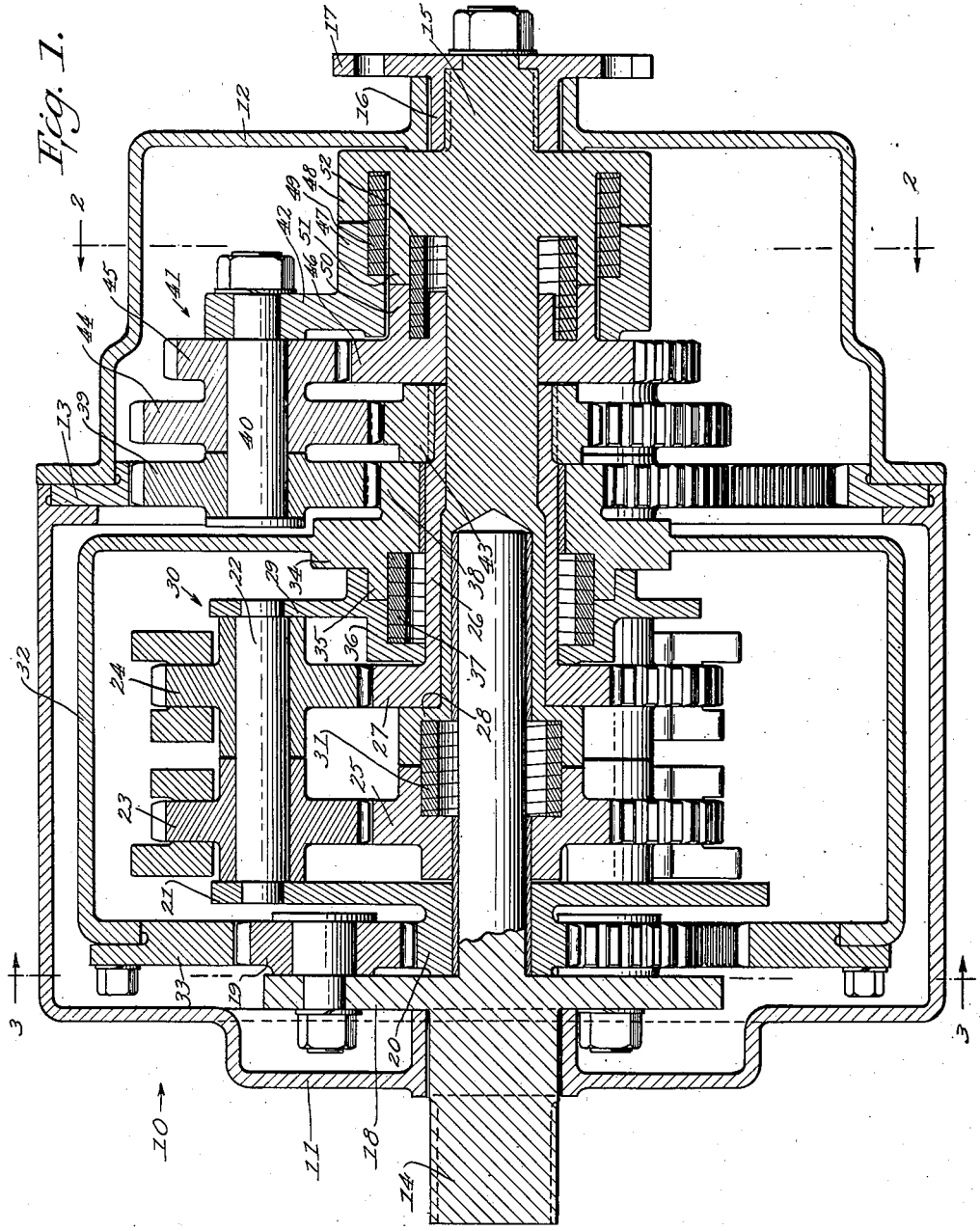
Figure 1 is an axial section of an at present preferred embodiment of the invention.
Figure 2:
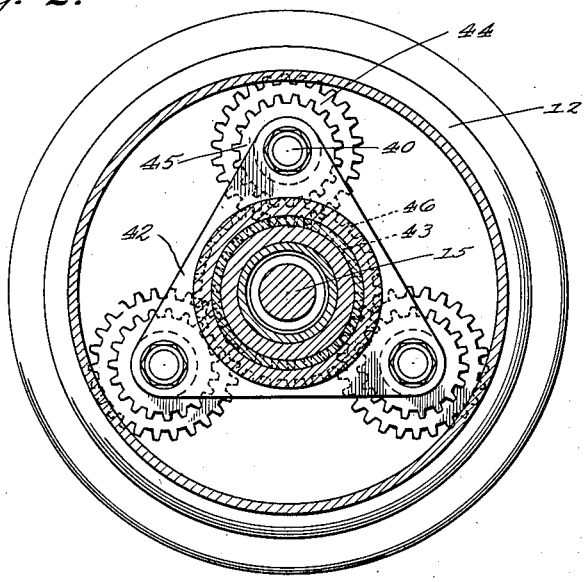
Figure 2 is a section substantially on line 2—2 of Figure 1.
Figure 3:
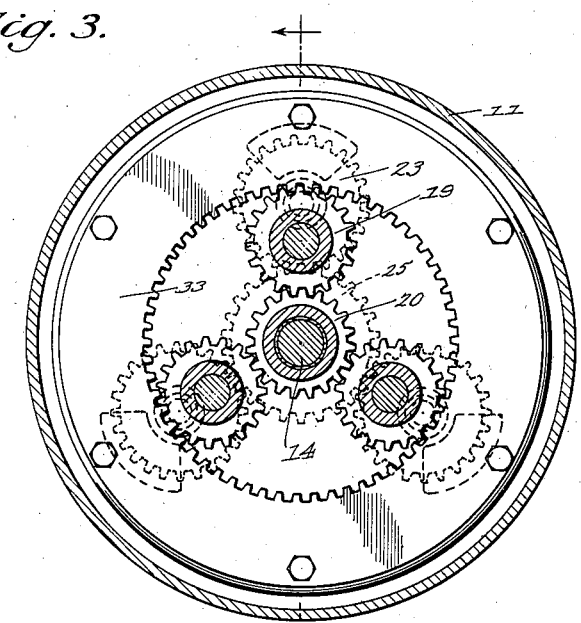
Figure 3 is a section substantially on line 3—3 of Figure 1.

Referring to the drawings, and first to Figures 1, 2 and 3, reference numeral 10 generally designates a housing composed of parts 11 and 12, conveniently of circular section, having flanges bolted together through an internal ring gear 13. Housing portion 11 provides a journal bearing for a drive shaft 14 which may be connected in any suitable manner with a source of power, for example, an automobile engine. Housing portion 12 provides a journal bearing for a driven shaft 15 or, as specifically shown in Figure 1, for the sleeve portion 16 of a take-off coupling flange 17, the sleeve portion being keyed to the shaft. The end of shaft 15 within the housing is counter-bored to provide a bearing for a pilot portion of shaft 14.

Just within the housing 10 shaft 14 has integral therewith, as here shown, a disc or spider 18 which carries three equi-distantly spaced planet gears 19. These planets engage a sun gear 20 rotatable on shaft 14 just inwardly of spider 18, the sun gear having integral therewith, as here shown, a spider or disc 21 pierced at equi-distantly spaced points to receive one end of pins 22 on which are rotatable two sets of eccentrically weighted planets 23 and 24. As here shown, each set includes three planets, the planets 23 being engaged with a sun gear 25 rotatable on shaft 14 and being identical and in equi-phase relation.

A sleeve 26 rotatable on shaft 15 has formed thereon a sun gear 27 which engages the planets 24, these being identical with each other and in equi-phase relation. Gear 27 is positioned on the one hand by a shoulder 28 on shaft 15 and on the other by a disc or spider 29 rotatable on sleeve 26 and pierced to receive the other ends of pins 22. Elements 21, 22 and 29 constitute a carrier generally designated by the reference numeral 30.

Sun gear 25 and shoulder 28 are provided with cylindrical flanges forming the driving and driven elements of a clutch connectible by an overrunning clutch spring 31 which is adapted to transmit drive in clockwise direction as seen from the left of Figure 1.

A drum 32 has fixed thereon an orbit gear 33 engaged with planet gears 19. Drum 32 has a portion 34, rotatable on sleeve 26 through the intermediary of a bushing, provided with a cylindrical flange 35 which serves to position carrier element 29 and also constitutes the driving part of an overrunning clutch which includes a driven portion 36 on element 29, the two being connectible by an overrunning clutch spring 37. Spring 37 is adapted to transmit clockwise rotation of drum 32 to the carrier 30.

Portion 34 of drum 32 is formed with a sun gear 38 which engages three planet gears 39 rotatable on pins 40 of a rotary carrier generally designated by the reference numeral 41, the carrier including a triangular plate portion 42, Figures 1 and 2. Planets 39 engage ring gear 13.

Keyed on the opposite end of sleeve 26 from gear 27 is a sun gear 43 which engages three planet gears 44 which are rotatable on the pins 40, gears 44 having integrally formed therewith, as here shown, smaller gears 45 which engage a sun gear 46 rotatable on shaft 15. Flange portions 47 and 48 of carrier 41 and shaft 15, respectively, are connectible by an overrunning clutch spring 49, and flange portions 50 and 51 of gear 46 and shaft 15, respectively, are connectible by an overrunning clutch spring 52. Springs 49 and 52 are operative to drive from carrier 41 and gear 46, respectively, in clockwise direction.

With shaft 15 at rest, drive from shaft 14 in clockwise direction will cause carrier 30 to be driven in the same direction at a 4:1 speed ratio, orbit gear 33 being held stationary by drum 32 due to the connection of the latter to the load. Forces build up in the eccentric trains, and first in the train including the planets 24, these planets having heavier weights (or being driven faster) so that the train which they constitute has greater capacity than the other. Torque is being directly applied to the load through clutch spring 31. Drum 32 acting through gears 38, 39, 13 and carrier 41, is applying torque to the load through clutch 49, and train 24 at a speed ratio of, for example, 3.5:1 is applying torque to the load through gear 27, sleeve 26, gears 43, 44, 45 and 46, and clutch 52. Clutch springs 31 and 52 serve as "throwouts" during the fourth part of the cycles of the eccentrics 23 and 24, i. e., during that portion of the cycles when the weights are moving outwardly. The torque at clutches 49 and 52 is greatly amplified as compared to that at clutch 31, the predominant force, and the force which eventually starts the load, being at 49.

As the load speeds up, drum 32 accelerates relative to carrier 30 and when the drum catches up with the carrier, clutch spring 37 becomes effective and the drum drives to the carrier. The consequent redistribution of torque is, in effect, a gear change.

When torques through clutches 31, 49 and 52 are effective to speed up the load shaft 15 sufficiently, then the load shaft overruns clutch 49 and clutches 31 and 52 carry the load and another gear change, in effect, has been accomplished. At this time the train 24 should lock in, but engine speed is still faster than load speed due to slippage through train 23.

When load speed has been further speeded up relative to the drive, shaft 15 overruns clutch 52 and load is carried entirely by clutch 31. A further torque change, or gear change, has been effected and train 23 should now lock in so that there is a solid drive from shaft 14 to shaft 15 through clutch 31, and while the reduction gearing constituted by gears 38, 39, 43, 44, 45 and 46 is rotating, it is merely idling, being under no load.

As the transmission system goes through the described stages there is a gradual division of forces as one is superseded by the next and the relative speed changes are compensated for by increased or decreased engine or load speeds. The transition is perfectly smooth throughout. Any necessity for racing the engine at start is completely avoided.

Figure 4:
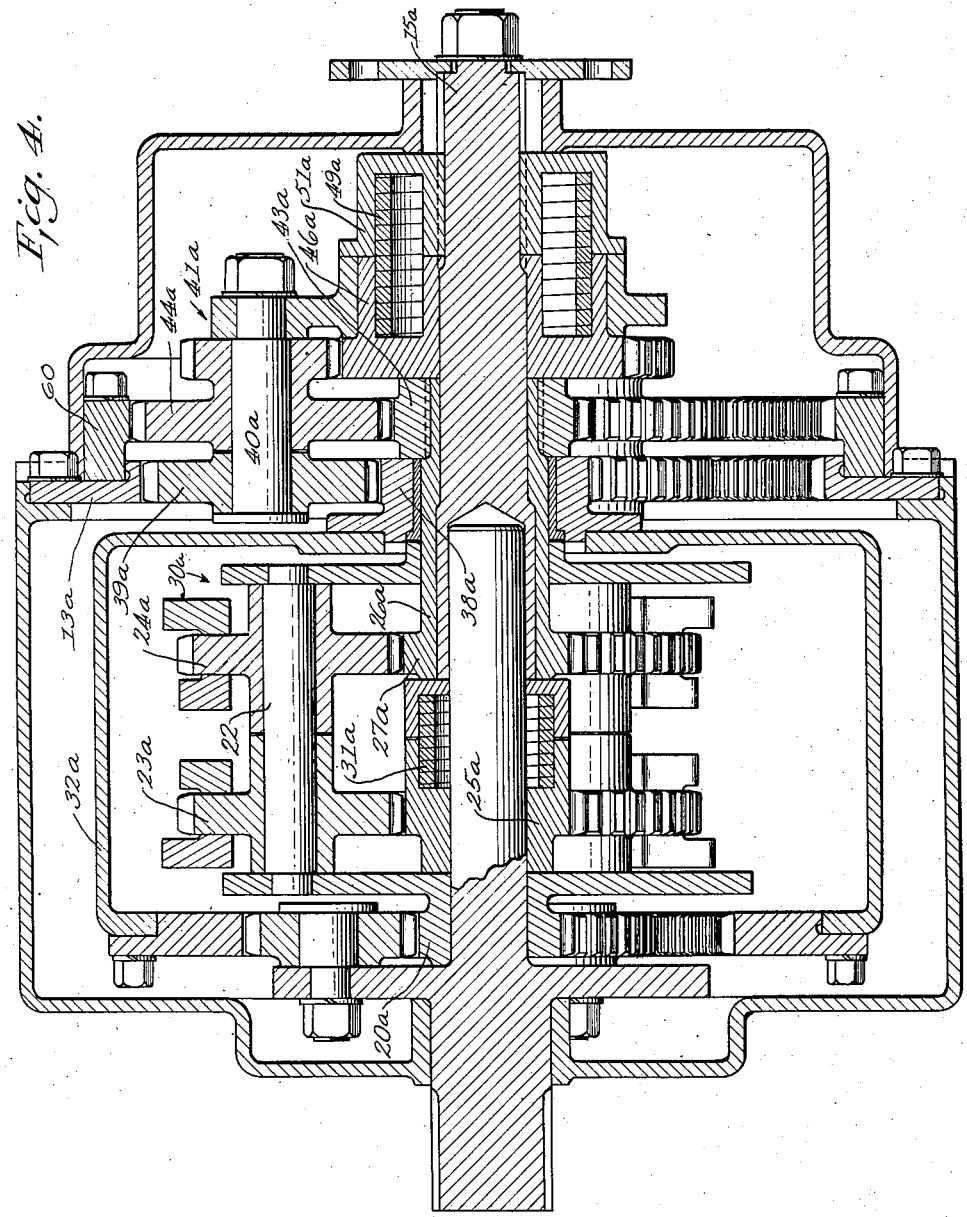
Figure 4 is an axial section of another embodiment of the invention, being a modification of the embodiment shown in Figures 1 to 3.

In Figure 4, the parts which correspond with those of Figures 1 to 3 will be given the same numerals with the addition of the letter a. Referring to Figure 4, gear 44a, as here shown, is somewhat larger than gear 39a and gear 43a is consequently somewhat smaller than gear 38a. Furthermore, gear 44a in this instance is engaged with an internal ring gear 60 which is bolted against the side of the ring gear 13a. Carrier 41a is freely rotatable on a cylindrical flange of gear 46a and the said flange is adapted to drive shaft 15a through flange 51a and the overrunning clutch spring 49a.

In this case, as resistance builds up in train 23a, tending to slow down gear 20a in relation to the drum 32a, a drive back to train 24a is effected from pin 40a through gears 44a and 43a, sleeve 26a and gear 27a, while at the same time, load is being carried through clutch 49a. Torque coming from gear 27a is amplified 2:1 to pins 22a.

This force to pins 22a combines with the force coming from gear 20a and speeds up the carrier 30a thereby building up forces in train 23a. When these forces equal load requirements, the load will overrun clutch 49a and will be carried by clutch 31a.

Due to the different ratios, gear 20a must always turn faster than drum 32a after the eccentrics stop planetating, thereby establishing an over-drive from engine to load.

Designs for automobile transmissions contemplate eccentric weights in train 24a of sufficient size, for example, to overcome the torque of gear 20a at approximately 1200 R. P. M. of carrier 30a, while the weights of train 23a will permit carrier speeds up to, say 1800 R. P. M. before complete lock-in under full engine torque. At about this same speed, forces in train 24a should lock in against drive back through gear 27a.

It will be recognized that during the cycles described, the torque speed ratio will vary between load at 46a and 25a, being controlled by decreasing load requirements and engine output.

Figure 5:
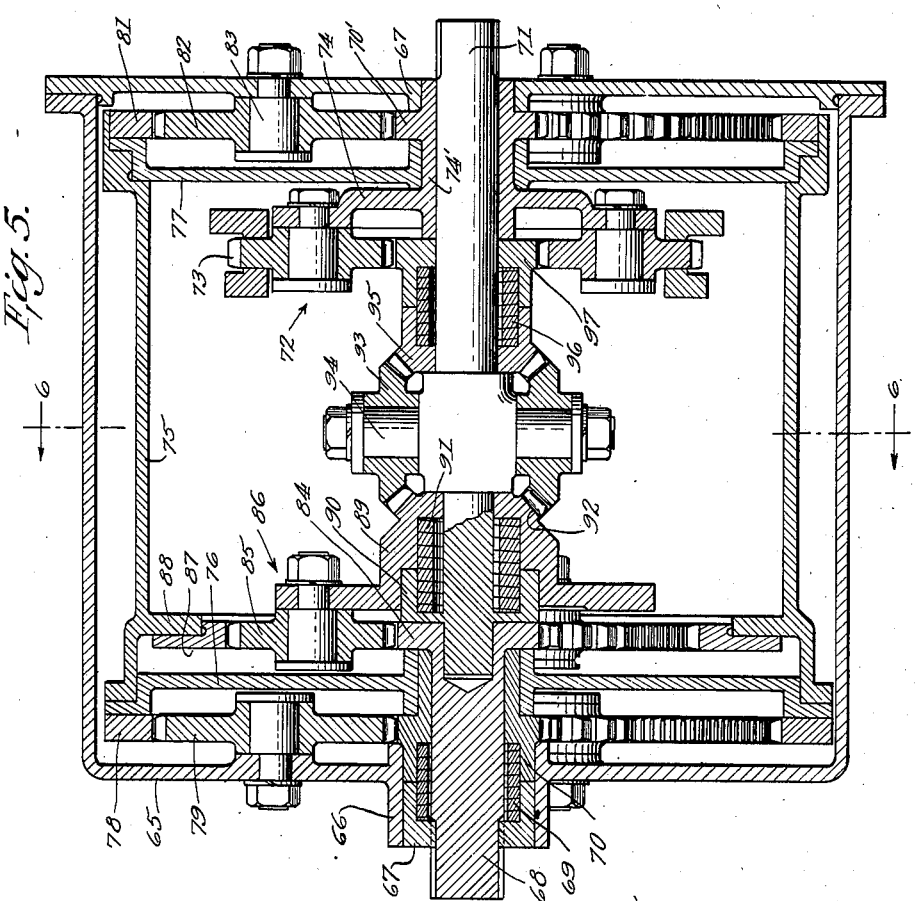
Figure 5 is an axial section of a further embodiment.
Figure 6:
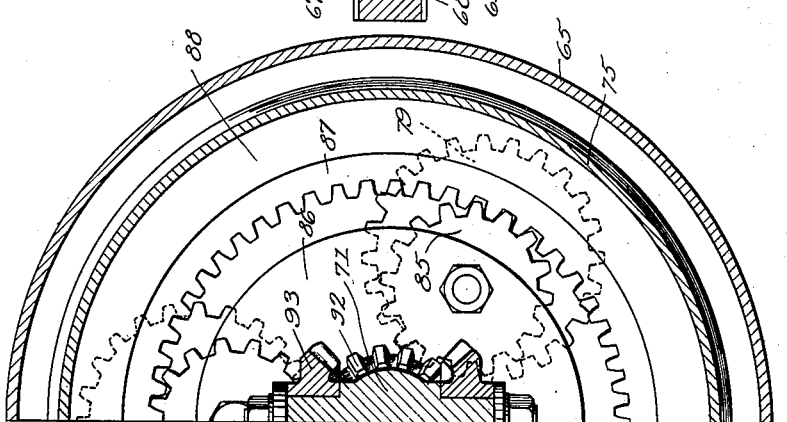
Figure 6 is a half section on line 6—6 of Figure 5.

Referring now to Figures 5 and 6, reference numeral 65 designates a housing having aligned front and rear bearings 66 and 67 formed in its end walls. Rotatable in bearing 66 is a drive member 67 keyed on a drive shaft 68 and adapted, through an overrunning clutch spring 69, to drive a gear 70 which is rotatable on shaft 68 and partially in bearing 66. Bearing 67 has rotatable therein a hub portion of a gear 70', the gear being rotatable on a driven shaft 71 and being of the same size as gear 70. The forward end of shaft 71 is journalled in a counter-bore in the inner end of shaft 68.

Reference numeral 72 designates a carrier for a system of eccentrically weighted pinions 73, these being four in number, for example, equidistantly spaced apart and in equi-phase relation. The carrier includes a disc 74 fixed to gear 70' through a sleeve portion 74'.

A drum 75 has head portions 76 and 77 mounted respectively for rotation on a sleeve portion of gear 70 and on sleeve portion 74'. Fixed to the head portion 76 is an internal ring gear 78 engaged by gears 79 which are mounted on studs 80 projecting inwardly of the front wall of housing 65. Gears 79 engage gear 70. Fixed to the head 77 is an internal ring gear 81, of the same size as gear 78, which engages gears 82, of the same size as gears 79, mounted on studs 83 projecting inwardly of the housing rear wall. Gears 82 engage gear 70'.

Shaft 68 has a sun gear 84 formed on its inner end and engaged with planet gears 85 on a carrier 86, the planet gears engaging an orbit gear 87 fixed against an internal radial flange 88 of drum 75. The carrier 86 has a hub portion 89 rotatable in part on shaft 71 and in part on a cylindrical flange 90 formed near the forward end of shaft 71, clockwise rotation, as seen from the left of Figure 5, of carrier 86 being transmittable from hub 89 to flange 90 through an overrunning clutch spring 91.

Hub 89 has formed thereon a bevel gear 92 which engages bevel gears 93 rotatable on radial studs 94 of shaft 71. Pinions 93 are engaged by a bevel gear 95 of the same size as gear 92, gear 95 being drivable through an overrunning clutch spring 96 by a sun gear 97 rotatable on shaft 71 and engaging planets 73.

The ratio from gear 70 to gear 78 is 1:4 and from gear 81 to gear 70' is 4:1. The ratio between gear 84 and gear 87 is 1:3.

In operation, with the load at a standstill, clutch 91 engages load and consequently bevel gear 92 cannot turn. The result is that drum 75 is rotated in a reverse direction (counterclockwise as seen from the left of Figure 5) driving carrier 72 forward at one and one-third engine speed. Gear 70 is driven forwardly at the same speed as the carrier 72, overrunning the clutch 69.

When resistance builds up in the weighted pinions sufficiently to retard rotation of drum 75, carrier 86 will begin to move in a clockwise direction relative to gear 87 and drive member 67 will pick up the drum through clutch 69, thereby maintaining the speed of carrier 72 at a definite ratio to drive.

Further forces built up in the weighted pinions will cause drive of differential pinion 95 through clutch 96 at a greater speed than that of pinion 92 through clutch 91. When centrifugal force in the weighted pinions reaches values that prevent their rotation, bevel gear 95 will be operating at engine speed while bevel gear 92 will be running at one-eighth engine speed, consequently producing a final drive of five-eighths engine speed regardless of what the latter speed may be. It will be noted that the torque ratio from gear 70 to gear 70' to load is 1:1 with engine while through the train 84, 85, 87, torque is amplified at a ratio of 4:1. The speed ratio is accordingly 1:3.

It will be evident from the above that the invention is susceptible of varied embodiment. I do not limit myself to described details of form and arrangement except as in the following claims.

I claim:

1. Means for transmitting rotary motion from a drive to a driven shaft, said means including plural paths, centrifugally controlled transmission means in one of said paths adapted to build up forces in said one of said paths to a point where a predetermined speed ratio is established between said shafts, torque amplifying means in one said paths, said centrifugally controlled transmission means including differential mechanism dividing the input into paths of which one includes torque amplifying means, the path which includes the torque amplifying means also including means successively disconnected from the load as the speed of the driven shaft approaches that of the drive shaft so that the final drive is through the other of said divided paths.

2. Means for transmitting rotary motion from a drive to a driven shaft, said means including a differential receiving and dividing the drive into a plurality of paths, one of said paths including centrifugally controlled transmission means adapted to build up forces in said one of said paths to a point where a predetermined speed ratio is established between said shafts, and torque amplifying means in said paths, said differential being so arranged as to increase the centrifugal effect in said centrifugally controlled transmission means whenever the speed of the driven shaft relative to that of the drive shaft is below that of said predetermined speed ratio 3. Means for transmitting rotary motion from a drive to a driven shaft, said means comprising a planet gear carried by the drive shaft, a sun gear and an orbit gear engaged by said planet gear for drive by the latter, centrifugally controlled transmission means driven by said sun gear, an overrunning clutch between said transmission means and the driven shaft, reduction gearing driven by said orbit gear, and an overrunning clutch between said reduction gearing and the driven shaft.

4. Means for transmitting rotary motion from a drive to a driven shaft, said means comprising a planet gear carried by the drive shaft, a sun gear and an orbit gear engaged by said planet gear for drive by the latter, centrifugally controlled transmission means driven by said sun gear, an overrunning clutch between said transmission means and the driven shaft, reduction gearing driven by said orbit gear, an overrunning clutch between said reduction gearing and the driven shaft, and means for transmitting the drive from said orbit gear to said transmission means subsequent to the start of the driven shaft.

5. Means for transmitting rotary motion from a drive to a driven shaft, said means comprising a planet gear carried by the drive shaft, a sun gear and an orbit gear engaged by said planet gear for drive by the latter, centrifugally controlled transmission means driven by said sun gear, an overrunning clutch between said transmission means and the driven shaft, reduction gearing driven by said orbit gear, an overrunning clutch between said reduction gearing and the driven shaft, and means operative subsequent to the start of the driven shaft for by-passing the drive from said orbit gear to said transmission means whereby said reduction gearing is rendered idle.

6. Means for transmitting rotary motion from a drive to a driven shaft, said means comprising a planet gear carried by the drive shaft, a sun gear and an orbit gear engaged by said planet gear for drive by the latter, centrifugally controlled transmission means including eccentrically weighted pinions and a rotary carrier for the pinions in driven connection with said sun gear, a sun gear engaged by said pinions, an overrunning clutch between the last-named sun gear and the driven shaft, reduction gearing driven by said orbit gear, an overrunning clutch between said reduction gearing and the driven shaft, and an overrunning clutch between said orbit gear and said carrier effective subsequent to start of the driven shaft so that said reduction gearing is rendered idle.

7. Means for transmitting rotary motion from a drive to a driven shaft, said means including a pair of oscillatory centrifugal systems in driven connection with the drive shaft, an overrunning clutch directly connecting one of said systems with the driven shaft, reduction gearing in driven connection with the other of said systems and an overrunning clutch between said reduction gearing and said driven shaft.

8. Mechanism according to claim 7 wherein of said pair of systems, said other has the greater torque capacity.

9. Means for transmitting rotary motion from a drive to a driven shaft, said means including a rotary carrier in driven connection with the drive shaft, two sets of eccentrically weighted pinions rotatably mounted on said carrier, a gear engaged by one of said sets of pinions, an overrunning clutch directly between the last named gear and the driven shaft, reduction gearing in driven connection with the other of said sets of pinions, and an overrunning clutch between said reduction gearing and said driven shaft.

10. Means for transmitting rotary motion from a drive to a driven shaft, said means comprising a planet gear carried by the drive shaft, a sun gear and an orbit gear engaged by said planet gear for drive by the latter, a carrier in driven connection with said sun gear, two sets of eccentrically weighted pinions rotatably mounted on said carrier, a gear engaged by one of said sets of pinions, an overrunning clutch directly between the last-named gear and the driven shaft, reduction gearing in driven connection with the other of said sets of pinions, an overrunning clutch between said reduction gearing and said driven shaft, reduction gearing in driven connection with said orbit gear, and an overrunning clutch between said last-named reduction gearing and said driven shaft.

11. Mechanism according to claim 10 wherein an overrunning clutch is provided between said orbit gear and said carrier effective subsequent to start of the driven shaft to transmit the drive from said orbit gear to said carrier so that said last-named reduction gearing is rendered idle.

12. Apparatus of the class described comprising a housing, a drive shaft and a driven shaft journalled coaxially in said housing, a planet gear carried by the drive shaft, a sun gear and an orbit gear engaged by said planet gear, said sun and orbit gears being rotatable on an axis coincidental with that of said shafts, a carrier fixed to said sun gear, two sets of weighted pinions rotatably mounted on said carrier, a pair of sun gears respectively engaged with the pinions of said sets and rotatable on an axis coincidental with that of said shafts, an overrunning clutch directly between one of said pair of sun gears and the driven shaft, a second pair of sun gears of which one is in driven connection with the other of said first pair and the other is in driven connection with said orbit gear, a second carrier rotatable on the axis of said shafts, a pair of planet gears on said second carrier of which the first is engaged with said other sun gear of said second pair of sun gears and the second is engaged with said one of said second pair of sun gears, an internal gear fixed in said housing and engaged by said first planet gear, an overrunning clutch between said second carrier and said driven shaft, a gear coaxial with said second planet gear and fixed thereto, a sun gear rotatable on the axis of said shafts and engaged by said coaxial gear, an overrunning clutch between the last-named sun gear and said driven shaft, and an overrunning clutch between said orbit gear and the first carrier effective subsequent to start of said driven shaft.

13. Mechanism according to claim 12 wherein of the two sets of weighted pinions the set engaged with said other of said first pair of sun gears has the greater capacity.

14. Apparatus of the class described comprising a housing, a drive shaft and a driven shaft journalled coaxially in said housing, a planet gear carried by the drive shaft, a sun gear and an orbit gear engaged by said planet gear, said sun and orbit gears being rotatable on an axis coincidental with that of said shafts, a carrier fixed to said sun gear, two sets of weighted pinions rotatably mounted on said carrier, a pair of sun gears respectively engaged with the pinions of said sets and rotatable on an axis coincidental with that of said shafts, an overrunning clutch directly between one of said pair of sun gears and the driven shaft, a second pair of sun gears of which one is in driven connection with the other of said first pair and the other is in driven connection with said orbit gear, a second carrier rotatable on the axis of said shafts, a pair of planet gears on said second carrier of which the first is engaged with said other sun gear of said second pair of sun gears and the second is engaged with said one of said second pair of sun gears, a pair of internal gears fixed in said housing and engaged by said first and second planet gears respectively, a gear coaxial with said second planet gear and fixed thereto, a sun gear rotatable on the axis of said shafts and engaged by said coaxial gear, and an overrunning clutch between the last-named sun gear and said driven shaft.

15. Apparatus of the class described comprising a housing, a drive shaft and a driven shaft journalled coaxially in opposite walls of said housing, a drum rotatable in said housing on the axis of said shafts, a gear rotatable on the drive shaft, an overrunning clutch between the drive shaft and said gear, a second gear of the same size as the first rotatable on the driven shaft, intermediate gears of equal size rotatably mounted on said opposite walls and engaging said first and second gears respectively, ring gears fixed on said drum and engaging said intermediate gears respectively, a carrier fixed to said second gear, eccentrically weighted planet gears rotatably mounted on said carrier, a sun gear rotatable on the axis of said shafts and engaged by said planet gears, a bevel pinion rotatable on the axis of said shaft, an overrunning clutch between said sun gear and said bevel gear, a second bevel gear engaging the first, a radial stud on the driven shaft on which said second bevel gear is rotatable, a third bevel gear coaxial with the first and engaging the second, a carrier fixed to said third bevel gear planet gears rotatably mounted on said carrier, a sun gear in fixed connection with the drive shaft engaging the planet gears of the last-named carrier, an orbit gear fixed to said drum and engaging the last-named planet gears, and an overrunning clutch between said last-named carrier and the driven shaft.

16. Means for transmitting rotary motion from a drive to a driven shaft, said means including plural paths, centrifugally controlled transmission means in one of said paths adapted to build up forces in said one of said paths to a point where a predetermined speed ratio is established between said shafts, torque amplifying means in another of said paths, and an overrunning clutch in said other of said paths through which drive is transmitted during the building-up period of said centrifugally controlled transmission means until the output side of the clutch overruns its input side due to acceleration of the driven shaft through said one of said paths.

17. Means for transmitting rotary motion from a drive to a driven shaft, said means including a pair of systems of eccentrically weighted planet gears driven from the drive shaft, and driving connections between said systems respectively and the driven shaft, the driving connection between one of said systems and the driven shaft being of amplified torque ratio as compared to the other system and including means disconnecting said one of said systems from said driven shaft when the latter attains a certain speed ratio with the drive shaft.

18. Mechanism according to claim 17 wherein a common carrier is provided for the two systems, and wherein said driving connections include coaxial sun gears respectively engaging the planet gears of the two systems.

FINLEY R. PORTER.